United States Patent Office 3,080,299
Patented Mar. 5, 1963

3,080,299
ACCELERATING MICROORGANISM PHYSIOLOGICAL ACTIVITY AND REPRODUCTION
Thomas J. Bulat, Davenport, Iowa, assignor to The Bendix Corporation, Davenport, Iowa, a corporation of Delaware
No Drawing. Filed July 5, 1960, Ser. No. 40,509
8 Claims. (Cl. 195—113)

This invention relates to methods and means for increasing the growth and physiological activity of microorganisms.

This invention has the effect of accelerating microorganism growth whereby to reduce generation. This may be accomplished by acceleration of both miotic and mitotic cell division in those microorganisms where the mode of cell division is known and by related methods in those microorganisms where the exact nature of cell division is unknown. Accordingly, the invention has the effect of increasing the number of such organisms during a defined length of time.

The inventions will also produce an increased amount of metabolic end products produced by the microorganisms. This is accomplished by stimulation of the microorganisms whereby a given number of them will produce a greater quantity of end products and by the fact that more organisms will be produced and therefore more metabolic products will be produced.

Accordingly, the invention is useful both for producing the microorganisms themselves and for producing the metabolic products of the organisms for applications wherein such products are used, for example as antibiotics and solvents.

Whereas sonic energy has heretofore been successfully employed in the destruction of microorganisms, the invention employs cavitation in liquid, advantageously induced by sonic energy. In the invention, microorganisms of the kind to be grown are combined with nutrient material in liquid form and the liquid is cavitated throughout the period or periods during which growth and metabolic activity are to be accelerated.

The term "cavitation" defines several types of action including one in which tiny bubbles, present in the liquid and created by the other actions, are made to collapse. This occurrence is sometimes called "vaporous cavitation" and accounts for violent pressure changes at points in the cavitated liquid. Thus a cavitated body of liquid experiences these violent pressure changes at myriads of microscopically spaced volumes of microscopic dimensions. Such pressure changes break up clusters of microorganisms and separate them from each other and from their metabolic waste products to bring them into contact with nutrients. The effect of cavitation then is to make nutrients more readily available to the organisms whereby growth and reproduction will occur in a shorter time. In the case of organisms that reproduce by meiosis, cavitation can increase association of the organisms and thus accelerate reproduction. This suggests that increased cavitation action is desirable. This is true but the violence of the action must not exceed the point at which the organisms are ruptured or otherwise damaged by subjection to excessive acceleration forces. Subjected to an alternating force, such as is presented by sonic energy, the liquid is subjected to recurring reductions and increases in pressure during which bubbles are enlarged and then collapsed. The force of the cavitation depends upon the change in bubble dimensions. The degree of this dimensional change increases with sonic energy intensity if frequency is unchanged and it decreases with frequency if sonic energy intensity is unchanged. Further, if frequency and sonic energy intensity are unchanged, the degree of cavitation violence increases with surface tension of the cavitated liquid and decreases with vapor pressure.

In practice, the degree of cavitation is limited by the dispersion of the sonic energy waves by the bubbles created in the cavitation process. After the sonic energy is increased to the threshold level of cavitation, further increase causes relatively low incremental increase in cavitation violence. The increased energy is dissipated primarily as heat whereby the temperature of the cavitated liquid is raised.

The energy threshold for cavitation in a given liquid, while relatively constant at low frequencies, increases rapidly at higher frequencies. The result is that the limits for practicing the process are that the sonic energy input must exceed the cavitation threshold level of the cavitated liquid and should not exceed a level at which heating of the liquid would be detrimental to rapid growth of the microorganism. No lower frequency limit is imposed but frequency is advantageously kept below 50 kilocycles per second, in the region in which threshold power levels are sufficiently low to preclude significant cellular damage to the organisms.

Water is an ideal constituent of the nutrients because its vapor pressure is high and heating is not excessive even when the sonic power input is very much greater than the threshold value which for water at atmospheric pressure is about one third of a watt per cubic centimeter at frequencies below 50 kilocycles per second.

Thus the limits when water is cavitated at atmospheric pressure are a sonic frequency less than about 50 kilocycles and sonic power input in excess of the cavitation threshold power, about one third watt per cubic centimeter of water to be cavitated, and less than an amount which heats the water to a temperature above which growth of the organisms is adversely affected. The nutrient is not limited by sonic activity and the best nutrient for the organism's growth may be employed. The time of application of the sonic energy is not critical. It is continued while accelerated organism and metabolism by-product production is desired and, except that addition of replenishing nutrient may be required, can be continued indefinitely.

The principle by which sonic energy or cavitation or both produce an increase in the metabolism rate in the microorganisms is not understood. However, the limits of sonic frequency and intensity and of time and temperature, if there are any limits, are outside those hereinbefore set forth and so need not be considered. Within the ranges described, there is a substantial increase in the production of metabolic by-products.

Such variables as the pressure at which the invention is practiced and the surfaced tension and vapor pressure of the cavitated liquid only change the threshold level of sonic energy required for cavitation. If sonic frequency is held below 50 kilocycles per second, they do not substantially effect the process but are important only to the economics of sonic energy production as long as cavitation is maintained.

The following examples are set forth as illustrations of the invention and are not to be construed as limiting the invention.

Example I

The reproduction and metabolic by-product production of *Penicillium notatum* is accelerated by suspending spores of *Penicillium notatum* in a solution consisting substantially of 20.0 grams of lactose, 40.0 milliliters of corn-steep liquor, 1.2 grams of glucose, 3.0 grams of $NaNO_3$, 0.5 gram of $KH_2PO_4$, 0.25 gram of $$MgSO_4 \cdot 7H_2O$$

and 1 liter distilled water per 10,000 spores and the mixture is cavitated by subjection to sonic energy at 20 kilocycles per second at a level of 2.2 watts per cubic centimeter of the mixture. After twenty hours the sonic level is increased to 2.5 watts per cubic centimeter and continued for an additional ten hours. Throughout the thirty hour period the temperature of the mixture is maintained between 70° centigrade and 75° centigrade by energization of electrically generated heat.

*Example II*

The reproduction and metabolic by-product production of *Acetobacter suboxydans* is accelerated by suspending spores of *Acetobacter suboxydans* in a solution of substantially 118.0 grams of glucose, 5.0 grams of corn-steep liquor, 0.3 gram of octadecyl alcohol, 27.0 grams of calcium carbonate and one liter of water per 100,000 spores. The mixture is cavitated as described in Example I.

*Example III*

The reproduction and metabolic by-product production of *Saccharomyces cerevisiae* is accelerated by suspension of *Saccharomyces cerevisiae* cells in a solution of 0.25 gram of glucose, 1.0 gram of beef extract, 0.5 gram of sodium chloride and 100 milliliters of distilled water per 10,000 cells and cavitating the mixture for five hours while maintaining the mixture at substantially 85° Fahrenheit.

*Example IV*

To accelerate growth, reproduction, and production of metabolic by-products in *Anacystis nidulans* they are suspended in a nutrious mixture of 0.15 gram ethylene diaminetetraacetic acid, 0.15 gram magnesium sulfate, 1.0 gram sodium nitrate, 0.01 gram calcium nitrate, 1 gram potassium nitrate and 1 liter of distilled water per 1,000 cells. The mixture is cavitated continuously for 24 hours and is maintained at substantially 100 degrees Fahrenheit over that period.

I claim:

1. The method of accelerating reproduction of microorganisms which comprises combining such organisms with nutrient matter to form a liquid mixture and effecting cavitation of the liquid mixture with less than destructive violence by sonic energy.

2. The method defined in claim 1 in which the sonic energy has a frequency less than 50 kilocycles per second.

3. The invention defined in claim 1 in which the degree of sonic energy is increased after the number of micro-organisms in the mixture has substantially increased.

4. The method of accelerating the production by micro-organisms of their metabolic by-products which comprises combining such organisms with nutrient matter to form a liquid mixture and effecting cavitation of said liquid mixture with less than destructive violence by sonic energy at a frequency below 50 kilocycles per second.

5. The method of accelerating the reproduction and production of metabolic by-products of *Penicillium notatum* which comprises suspending said *Penicillium notatum* in the nutrious mixture of substantially 20.0 grams of lactose, 40.0 milliliters of corn-steep liquor, 1.2 grams of glucose, 3.0 grams of $NaNO_3$, 0.5 gram of $KH_2PO_4$, 0.25 gram of $MgSO_4 \cdot 7H_2O$ and 1 liter distilled water per 10,000 spores and cavitating said mixture by the application of sonic energy thereto with less than destructive violence while maintaining said mixture at a temperature of substantially 70 to 75° centigrade.

6. The method of accelerating the reproduction and production of metabolic by-products of *Acetobacter suboxydans* which comprises suspending said *Acetobacter suboxydans* in the nutrious mixture of substantially 118.0 grams of glucose, 5.0 grams of corn-steep liquor, 0.3 gram of octadecyl alcohol, 27.0 grams of calcium carbonate and one liter of water per 100,000 spores and cavitating said mixture by the application of sonic energy thereto with less than destructive violence while maintaining said mixture at a temperature of substantially 70 to 75° centigrade.

7. The method of accelerating the reproduction and production of metabolic by-products of *Saccharomyces cerevisiae* which comprises suspending said *Saccharomyces cerevisiae* in the nutrious mixture of substantially 0.25 gram of glucose, 1.0 gram of beef extract, 0.5 gram of sodium chloride and 100 milliliters of distilled water per 10,000 cells and cavitating said mixture by the application of sonic energy thereto with less than destructive violence while maintaining said mixture at a temperature of substantially 85° Fahrenheit.

8. The method of accelerating the reproduction and production of metabolic by-products of *Anacystis nidulans* which comprises suspending said *Anacystis nidulans* in the nutrious mixture of substantially 0.15 gram ethylene diaminetetra-acetic acid, 0.15 gram magnesium sulfate, 1.0 grams sodium nitrate, 0.01 gram calcium nitrate, 1 gram potassium nitrate and 1 liter of distilled water per 1,000 cells and cavitating said mixture by the application of sonic energy thereto with less than destructive violence while maintaining said mixture at a temperature of substantially 100° Fahrenheit.

References Cited in the file of this patent

UNITED STATES PATENTS

| | | |
|---|---|---|
| 2,585,103 | Fitzgerald | Feb. 12, 1952 |
| 2,745,789 | Specht | May 15, 1956 |

FOREIGN PATENTS

| | | |
|---|---|---|
| 417,863 | Great Britain | Oct. 11, 1934 |

OTHER REFERENCES

Stumpf et al.: Metrasonic Disintegration as a Method of Extracting Bacterial Enzymes, Journal of Bacteriology, vol. 51, 1946, pp. 487–493.